United States Patent
Yoon et al.

(10) Patent No.: US 7,391,727 B2
(45) Date of Patent: Jun. 24, 2008

(54) DE-RATE MATCHING METHOD AND APPARATUS IN A HIGH SPEED DOWNLINK PACKET ACCESS SYSTEM

(75) Inventors: Su-Jin Yoon, Suwon-si (KR); Hoon-Geun Song, Incheon (KR); Dong-Wook Park, Suwon-si (KR); Gin-Kyu Choi, Seoul (KR); Yong-Suk Moon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 565 days.

(21) Appl. No.: 11/066,551

(22) Filed: Feb. 28, 2005

(65) Prior Publication Data

US 2005/0201283 A1    Sep. 15, 2005

(30) Foreign Application Priority Data

Feb. 27, 2004    (KR) .................... 10-2004-0013590

(51) Int. Cl.
   *G01R 31/08* (2006.01)
(52) U.S. Cl. ........................................ 370/232
(58) Field of Classification Search ............ 370/468, 370/232, 342, 349, 335, 431, 441, 329, 333
   See application file for complete search history.

(56) References Cited

U.S. PATENT DOCUMENTS

| 6,901,063 | B2 * | 5/2005 | Vayanos et al. | ............ 370/335 |
| 7,269,783 | B2 * | 9/2007 | Barry et al. | ................ 714/790 |

* cited by examiner

*Primary Examiner*—Chirag G Shah
*Assistant Examiner*—Ramtin Kangarloo
(74) *Attorney, Agent, or Firm*—Roylance, Abrams, Berdo & Goodman, LLP (57) ABSTRACT

A de-rate matching method and apparatus in a High Speed Downlink Packet Access (HSDPA) system are provided. In the de-rate matching apparatus and method, a collection buffer temporarily stores a received packet, a combining buffer stores the packet received from the collection buffer according to predetermined memory address information including information indicating the positions of bits punctured during the rate matching, a controller decodes high-speed shared common control channel (HS-SCCH) information including a predetermined hybrid automatic repeat request (HARQ) parameter received from the transmitter and provides overall control to de-rate matching between the collection buffer and the combining buffer, an address generator generates the memory address information based on the decoded HARQ parameter, an address buffer stores the memory address information, and a zero inserter initializes at least one of data stored at memory addresses of the combining buffer including memory addresses for the punctured, before the de-rate matching.

11 Claims, 10 Drawing Sheets

DE-RATE MATCHING METHOD AND APPARATUS IN A HIGH SPEED DOWNLINK PACKET ACCESS SYSTEM

PRIORITY

This application claims the benefit under 35 U.S.C. § 119 (a) to an application entitled "De-rate Matching Method and Apparatus in a High Speed Downlink Packet Access System" filed in the Korean Intellectual Property Office on Feb. 27, 2004 and assigned Ser. No. 2004-13590, the entire contents of which are incorporated herein by reference.

BACKGROUND OF THE INVENTION

1. Field of the Invention

The present invention relates generally to a packet receiving method and apparatus in a mobile communication system. In particular, the present invention relates to a method and apparatus for receiving downlink rate-matched packet data from a Node B and de-rate matching the received packet data at a User Equipment (UE) in a High Speed Downlink Packet Access (HSDPA) system.

2. Description of the Related Art

Mobile communication systems typically adopt multiple access techniques. Multiple access systems comprise Frequency Division Multiple Access (FDMA), Time Division Multiple Access (TDMA), and Code Division Multiple Access (CDMA). In FDMA, a total frequency band is divided into a plurality of channels, each channel being allocated to one user. In TDMA, a plurality of users share the same frequency channel at different times. CDMA allows a plurality of users to simultaneously access the sane frequency band. The users for the various systems are separated because they use different codes for communications. With today's rapid development of communication technology, these mobile communication systems have reached the point where they can provide packet data service or packet service which covers high-speed, high-quality digital data transmission such as moving pictures, and multimedia service, in addition to the standard voice service.

Mobile communication systems typically use CDMA for the provisioning of the packet data service. Major high-speed packet data transmission systems based on CDMA include High Speed Downlink Packet Access (HSDPA) proposed by $3^{rd}$ Generation Partnership Project (3GPP), and Evolution-Data Only (EV-DO) and Evolution-Data and Voice (EV-DV) which are synchronous systems proposed by $3^{rd}$ Generation Partnership Project 2 (3GPP2). HSDPA is a standard that was proposed on May, 2002 to enable high-speed downlink packet transmission in Universal Mobile Telecommunication Systems (UMTSs), and specifies the configuration of transport and control channels associated with high-speed packet transmission to UEs and their operation.

Meanwhile, HSDPA regulates that a UE, after receiving a packet from a Node B, notifies the Node B as to whether the reception is successful or not. In the absence of errors in the received packet, the UE requests the retransmission of the packet by a link control protocol Hybrid Automatic Repeat Request (HARQ). Because receiving packets free of noise or distortion over a radio network at a UE is impossible to physically achieve, many packet retransmission techniques were introduced to HARQ to overcome this problem.

The packet retransmission techniques include Chase Combining (CC), Full Incremental Redundancy (FIR), and Partial Incremental Redundancy (PAIR). CC retransmits the same packet as that of the first attempt. A UE receiver combines the retransmitted packet with the buffered original packet. The resulting increased reliability of coded bits at the input of a channel decoder improves the whole system performance gain. The FIR scheme retransmits a completely different packet from the first one. The retransmitted packet comprises only parity bits produced in a channel encoder, thereby yielding better packet transmission performance by reducing a coding rate. The PIR scheme retransmits a partially different packet from the first one. The retransmitted packet is a combination of systematic bits and parity bits.

HARQ packet retransmission involves rate matching in a Node B transmitter and de-rate matching in a UE receiver. In most cases, the number of coded bits in the transmitter is different from that of the bits of a transport unit (TU) actually transmitted over a radio network. The rate matching refers to adaptation of the number of coded bits to that of bits suitable for transmission over a radio network through repetition or puncturing, prior to transmission. The de-rate matching is the reverse of rate matching before decoding repeated or punctured data received from the transmitter.

With reference to FIG. 1 to FIG. 4, the typical HARQ packet transmission/retransmission will be detailed.

Figure 1:
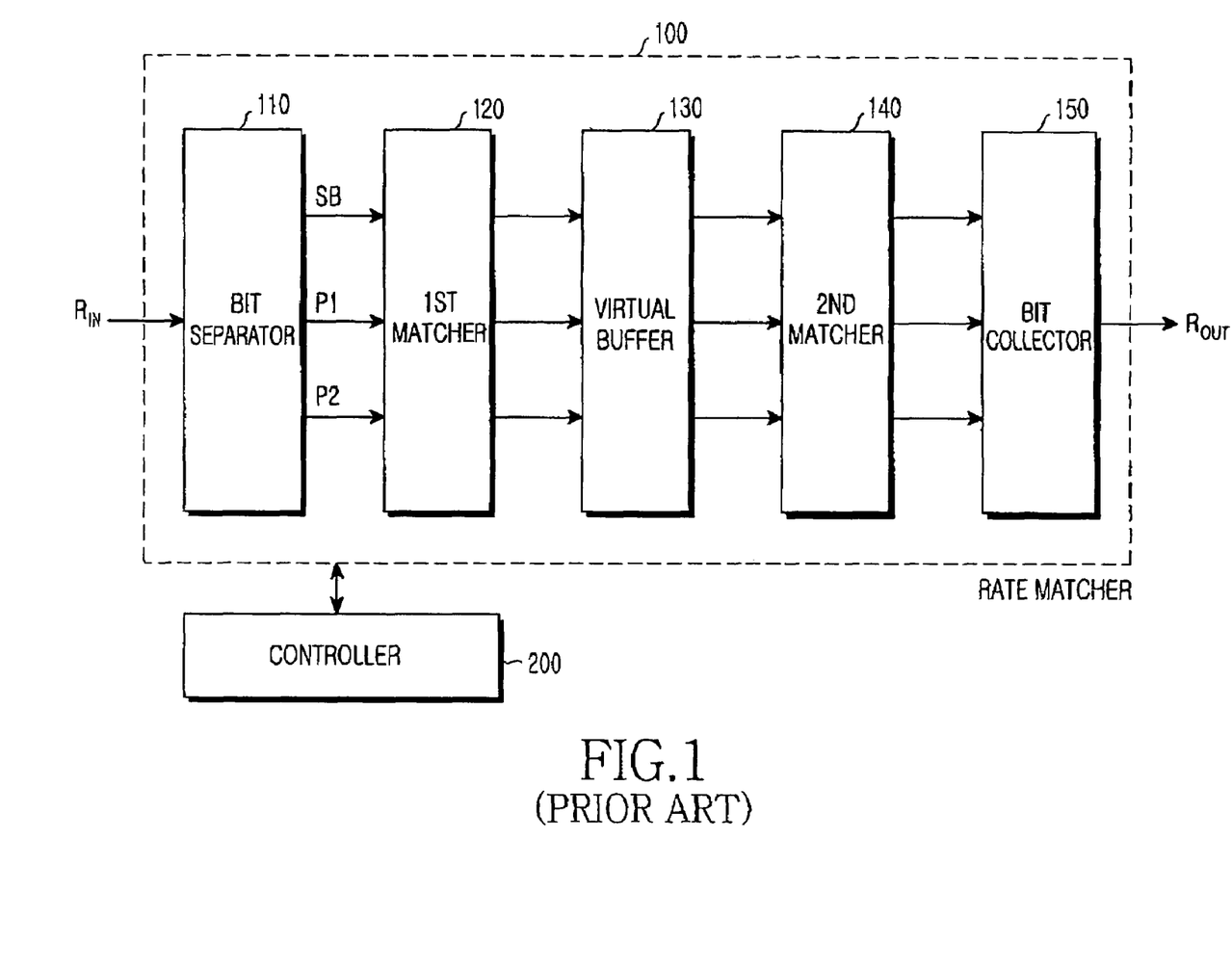
FIG. 1 is a block diagram of a rate-matching apparatus in a conventional HSDPA system.

FIG. 1 is a block diagram of a rate matching apparatus in a conventional HSDPA system. The rate matching apparatus is provided in a transmitter of, for example, a Node B. The rate matching occurs in each HARQ processor.

Referring to FIG. 1, a rate matcher 100 separates a signal $R_{IN}$ having coded bits received under the control of a controller 200 into systematic bits SB, first parity bits P1, and second parity bits P2, primarily matches the total number of the bits of SB, P1 and P2 to a predetermined bit number, and secondarily matches the first-rate matched bit number to the number of bits transportable on a physical channel over a radio network. After the second rate matching, the coded bits are subject to interleaving and modulation prior to transmission.

For the above operation, a bit separator 110 separates $R_{IN}$ into SB, P1 and P2. A first matcher 120 primarily rate-matches SB, P1 and P2 using a virtual buffer 130 of which the size is set to a predetermined value in each HARQ processor. In the first rate matching, if the total data size of SB, P1 and P2 exceeds the size of the virtual buffer 130, P1 and P2 are punctured to match the buffer size by using a predetermined rule.

A second matcher 140 readjusts the number of the bits received from the first matcher 120 and the virtual buffer 130 to that of bits transportable on the physical channel over the radio network. In the second rate matching, if the number of the first rate-matched bits is less than the bit number of the TU of the physical channel, predetermined bits are repeated in a predetermined rule. If the number of the first rate-matched bits is larger than the bit number of the TU, the predetermined bits are punctured.

At a packet retransmission, the pattern of the second rate matching is changed, that is, a so-called hybrid retransmission is performed. Hybrid retransmission refers to a rate-matching pattern change such as changing rate-matched bits, puncturing of parity bits mainly with a higher priority given to system bits, or puncturing of system bits mainly with a higher priority given to parity bits.

A bit collector 150 rearranges the second rate-matched packet bits to an interleaver size, for interleaving. The interleaved packet is modulated and transmitted over the radio network. In this way, the configuration illustrated in FIG. 1 adapts the data size of a transmission/retransmission packet to that suitable for the physical channel through first and second rate matchings in the transmitter, prior to transmission to the receiver.

Regarding packet retransmission involving the first and second rate matchings, several retransmission techniques can be employed for initial transmission and retransmission such as transmission of system bits only, transmission of the system bits, and first and second parity bits, and transmission of the system bits and partial first and second parity bits.

Figure 2:
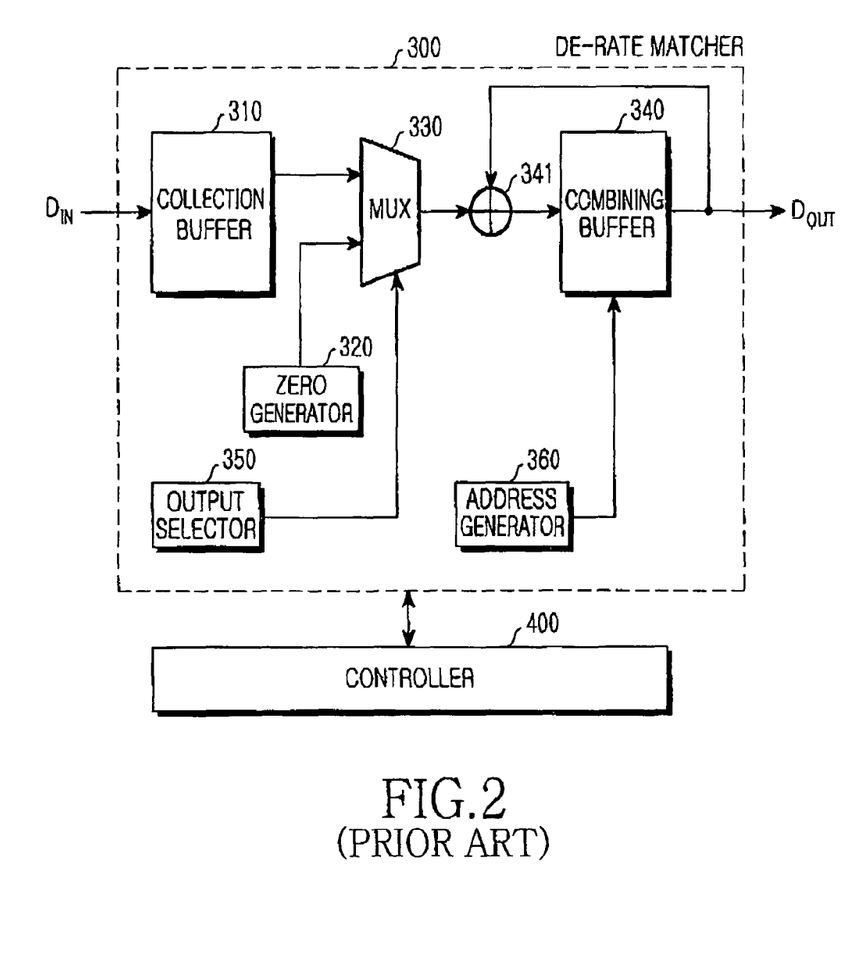
FIG. 2 is a block diagram of a de-rate matching apparatus in the conventional High Speed Downlink Packet Access (HSDPA) system.

FIG. 2 is a block diagram of a de-rate matching apparatus in the conventional HSDPA system. The de-rate matching apparatus is provided in a receiver of, for example, a UE. The de-rate matching is the reverse of the rate matching. The de-rate matching apparatus comprises a de-rate matcher 300 for combining an initial transmitted packet with a retransmitted packet and writing the combined data in a combining buffer 340, and a controller 400 for providing overall control to the operation of the de-rate matcher 300.

Referring to FIG. 2, the controller 400 decodes a High Speed Shared Control Channel (HS-SCCH) signal received along with packet data over the radio network, interprets predetermined HARQ parameters, and determines whether the packet data is an initial transmitted packet or a retransmitted packet. It also determines whether to combine data according to the determination. In the case of an initial transmitted packet, a collection buffer 310 of the de-rate matcher 200 temporarily buffers an input signal $D_{IN}$ from a demodulator (not shown).

In relation to de-rate matching, a zero generator 320 outputs zeroes under the control of the controller 400 so that the zeroes can be inserted in punctured positions. A multiplexer (MUC) 330, of which the input port is connected to the collection buffer 310 and the zero generator 320, selectively outputs to the combining buffer 340 the data received from the collection buffer 310 or the zeroes received from the zero generator 320 according to a predetermined select command.

The combining buffer 340 stores the de-rate matched data at predetermined addresses indicated by an address generator 360. The controller 400 determines the punctured positions in $D_N$ from the HARQ parameters and controls the address generator 360 to generate the address at which the data from the collection buffer 310 is stored and an address at which the zeroes from the zero generator 320 are stored.

Figure 10A:
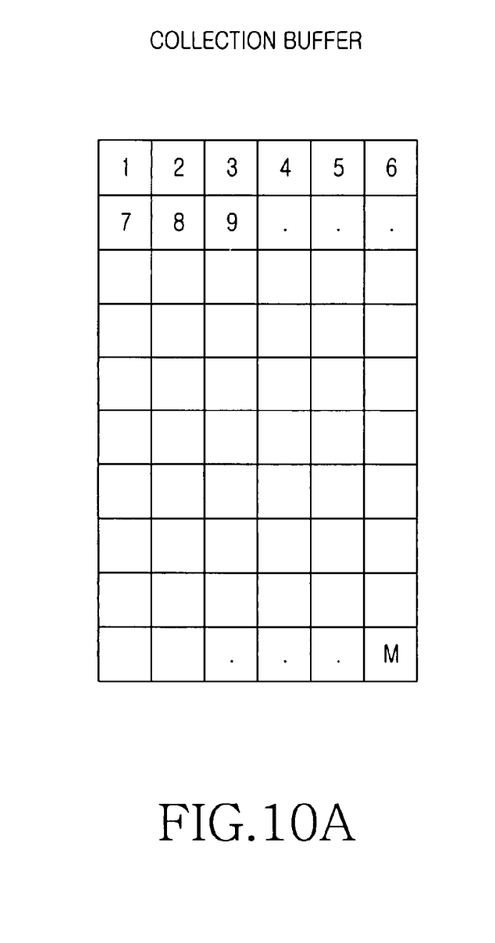
FIGS. 10A and 10B illustrate examples of received packet data buffered in a collection buffer and punctured data buffered in a combining buffer.
Figure 10B:
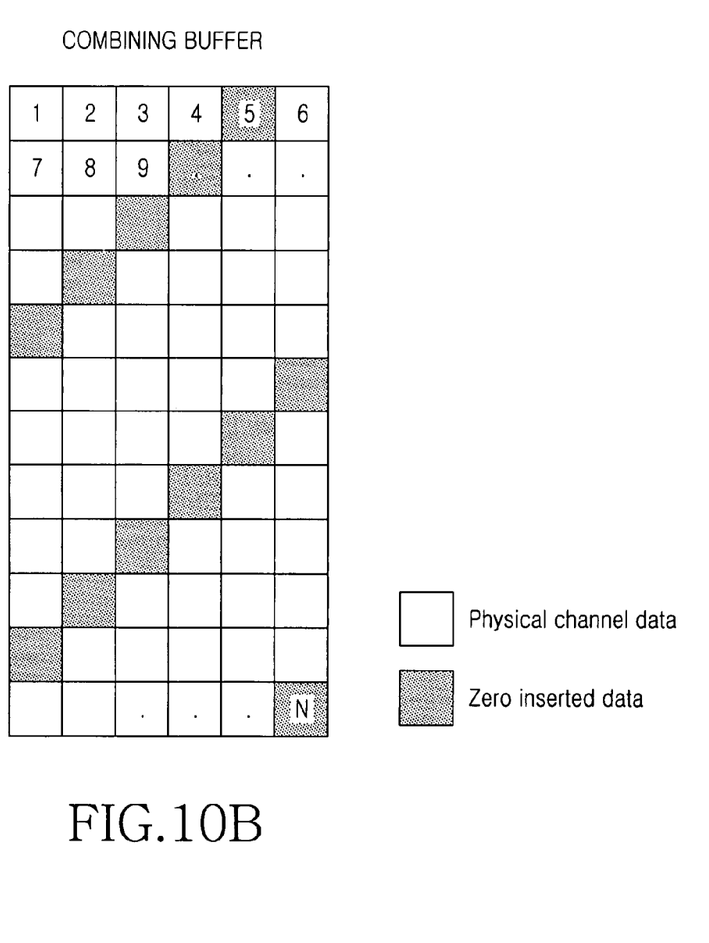

The address generator 360 generates addresses, starting from the de-rate matching. The number of the addresses is identical to the bit number of the data including the zeroes buffered in the combining buffer 340. The conventional de-rate matching performed in the configuration of FIG. 2 will be described below with reference to FIGS. 10A and 10B. FIG. 10A illustrates an example of data buffered in the collection buffer 310 before de-rate matching and FIG. 10B illustrates de-rate matched data buffered in the combining buffer 340. It is assumed herein that data is punctured at positions #5, #10, #15, #20, and so on during the second rate matching in the configuration of FIG. 1.

In this case, data #1, #2, #3 and #4 in the collection buffer 310 are stored as they are in the de-rate matching, as illustrated in FIG. 10B. Since #5 is set as a punctured position in the combining buffer 340, zero generated from the zero generator 320 is stored at the position #5. Therefore, data #5 in FIG. 10A is stored as data #6 in FIG. 10B and the following data is de-rate matched and stored in the same manner.

Meanwhile, when a retransmitted packet is received at the de-rate matching apparatus illustrated in FIG. 2 according to the HARQ protocol operation, the retransmitted packet is provided to a combiner 341 through the collection buffer 310 and the MUX 330 under the control of the controller 400. The initial transmitted packet is retrieved from the combining buffer 340 and provided to the combiner 341. The initial transmitted packet is combined with the retransmitted packet in the combiner 341 and then stored in the combining buffer 340. As stated above, zeroes are inserted at punctured positions in the storing operation.

The above-described de-rate matching apparatus recovers a packet transmitted from the rate matching apparatus of the transmitter over the radio network to the original data before rate matching. Notably, this conventional de-rate matching apparatus is configured to support the FIR scheme in that a packet received on a physical channel and zeroes in place of punctured data are sequentially stored in the combining buffer 340 in de-rate matching. Since addresses are generated at which the data are stored and at the same time, zeroes are inserted at punctured addresses in the course of buffering the data of a received packet, the de-rate matching is time consuming.

Figure 3:
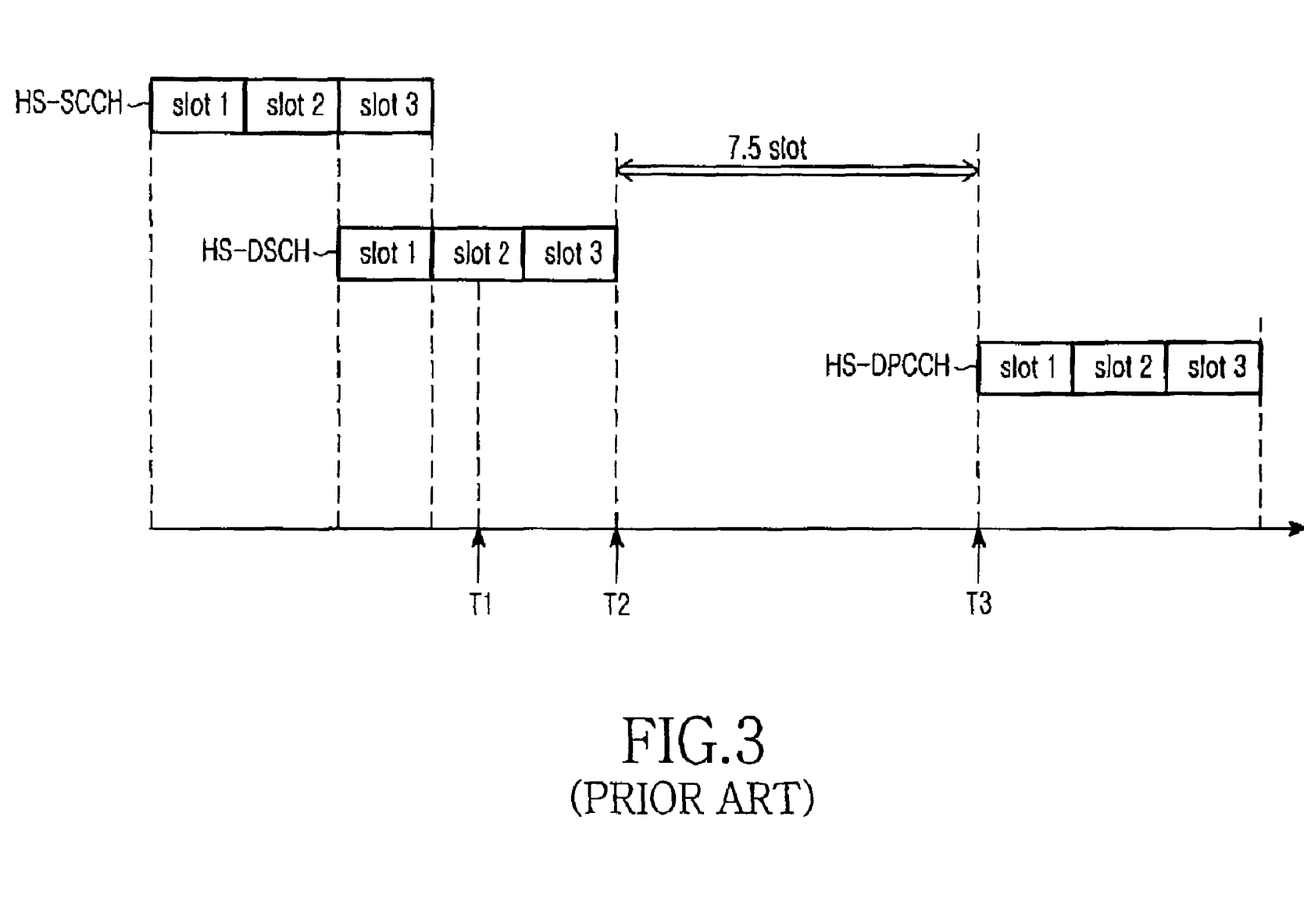
FIG. 3 is a diagram illustrating the transmission timings of channel information transmitted/received between a Node B and a user equipment (UE) in transmitting packets in the conventional HSDPA system.
Figure 4:
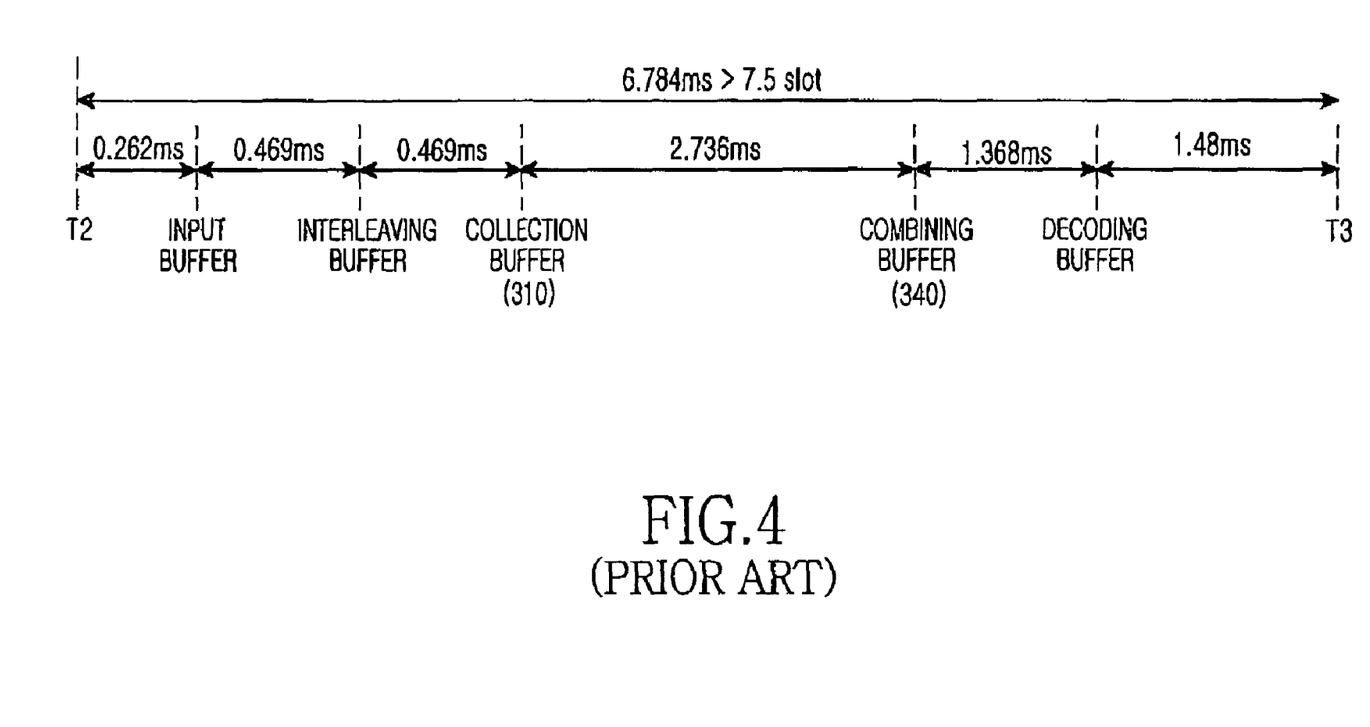
FIG. 4 illustrates time required for de-rate matching in the conventional HSDPA system.

With reference to FIGS. 3 and 4, the time required for the typical rate matching and de-rate matching will be addressed.

FIG. 3 is a diagram illustrating the transmission timings of channel information transmitted/received between a Node B and a UE in packet transmission in the typical HSDPA system. In the illustrated case, an HSDPA packet is delivered on a 3-slot basis.

Upon generation of a downlink packet, the Node B transmits control information including HARQ parameters to the UE on a HS-SCCH. Two slots later, the Node B transmits a packet to the UE on a High Speed Downlink Shared Channel (HS-DSCH). The UE subjects the HS-DSCH packet to demodulation, de-rate matching and decoding. Then, it transmits to the Node B an ACK/NACK signal indicating whether the downlink packet has reception errors or not, and a Channel Quality Indicator (CQI) on a High Speed Dedicated Physical Control Channel (HS-DPCCH). The Node B determines whether to retransmit the packet based on the ACK/NACK information.

In FIG. 3, T1 denotes a time point at which decoding of the HS-SCCH information is completed and T2 denotes a time point at which the HS-DSCH is completely received. Decoding of the received packet is completed at time T3. The HSDPA standard recommends that the time between T2 and T3 is 7.5 or less slots (5 ms or less). This implies that the UE receiver, after receiving a downlink packet, must complete de-rate matching and packet decoding within the time of 7.5 slots.

FIG. 4 illustrates the time required for de-rate matching in the conventional HSDPA system. In the figure, the processing time in each input buffer (not shown) and each interleaving buffer (not shown), the collection buffer 310 and the combining buffer 340 for de-rate matching, and a decoding buffer (not shown) is sequentially illustrated between T2 and T3. This corresponds to the decoding time of UE category 10 in 3GPP Release 15, for example.

Referring to FIG. 4, the de-rate matching between the collection buffer 310 and the combining buffer 340 occupies 40% or more of 7.5 slots (5 ms), 2.736 ms. The de-rate matching apparatus illustrated in FIG. 2 does not satisfy the time requirement of 7.5 or less slots. Moreover, UEs of higher categories including UE category 7 do not satisfy the time requirement, either. While the problem can be solved by using an additional buffer that reduces the de-rate matching time through distributed processing of a received packet, or by increasing the frequency of a packet transmission clock, the former method makes UE configuration complex and increases product cost, and the latter method increases UE power consumption.

Therefore, there is a need for reducing the time required for de-rate matching of a received packet in an HSDPA system.

SUMMARY OF THE INVENTION

An object of the present invention is to substantially solve at least the above problems and/or disadvantages and to provide at least the advantages below. Accordingly, an object of the present invention is to provide a de-rate matching method and apparatus for reducing the time required for de-rate matching of a received packet in a High Speed Downlink Packet Access (HSDPA) system.

The above and other objects are achieved by providing a de-rate matching method and apparatus in an HSDPA system.

According to one aspect of the present invention, in a method of de-rate matching an initial transmitted packet data between a collection buffer and combining buffer in a receiver, the initial transmitted packet data being rate-matched in a transmitter in a high-speed packet transmission system, High Speed Shared Control Channel (HS-SCCH) information comprising a predetermined Hybrid Automatic Repeat Request (HARQ) parameter associated with packet transmission is received from the transmitter and decoded. Memory information related to a plurality of memory addresses for de-rate matching of the initial transmitted packet to be received is generated according to the decoded HARQ parameter and stored. Data stored at memory addresses of the combining buffer including memory addresses for bits punctured during the rate matching are initialized. The initial transmitted packet data output from the collection buffer is sequentially stored at memory addresses other than the memory addresses for the punctured bits according to the memory information in the combining buffer.

According to another aspect of the present invention, in a method of de-rate matching a retransmitted packet data between a collection buffer and combining buffer in a receiver, the retransmitted packet data being rate-matched in a transmitter in a high-speed packet transmission system, HS-SCCH information comprising a predetermined HARQ parameter associated with packet transmission is received from the transmitter and decoded. Memory information related to a plurality of memory addresses for de-rate matching of the retransmitted packet to be received is generated according to the decoded HARQ parameter and stored. Previous packet data stored in the combining buffer are combined with the retransmitted packet stored in the collection buffer and sequentially stored at memory addresses other than memory addresses for bits punctured during the rate matching according to the memory information in the combining buffer.

According to a further aspect of the present invention, in an apparatus for de-rate matching a received packet which is rate-matched in a transmitter in a high-speed packet transmission system, a collection buffer temporarily stores the received packet, a combining buffer stores the packet received from the collection buffer according to predetermined memory address information including information indicating the positions of bits punctured during the rate matching, a controller decoded HS-SCCH information including a predetermined HARQ parameter received from the transmitter and provides overall control to de-rate matching between the collection buffer and the combining buffer, an address generator generates the memory address information based on the decoded HARQ parameter, an address buffer stores the memory address information, and a zero inserter initializes at least one of data stored at memory addresses of the combining buffer including memory addresses for the punctured, before the de-rate matching.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Embodiments of the present invention will be described herein below with reference to the accompanying drawings. In the following description, well-known functions or constructions are not described in detail for conciseness.

Rate matching is performed through puncturing or repetition. The expiration of time in de-rate matching illustrated in FIG. 4 is associated with puncturing only. Therefore, the following description of de-rate matching will be focused on puncturing.

Figure 5:
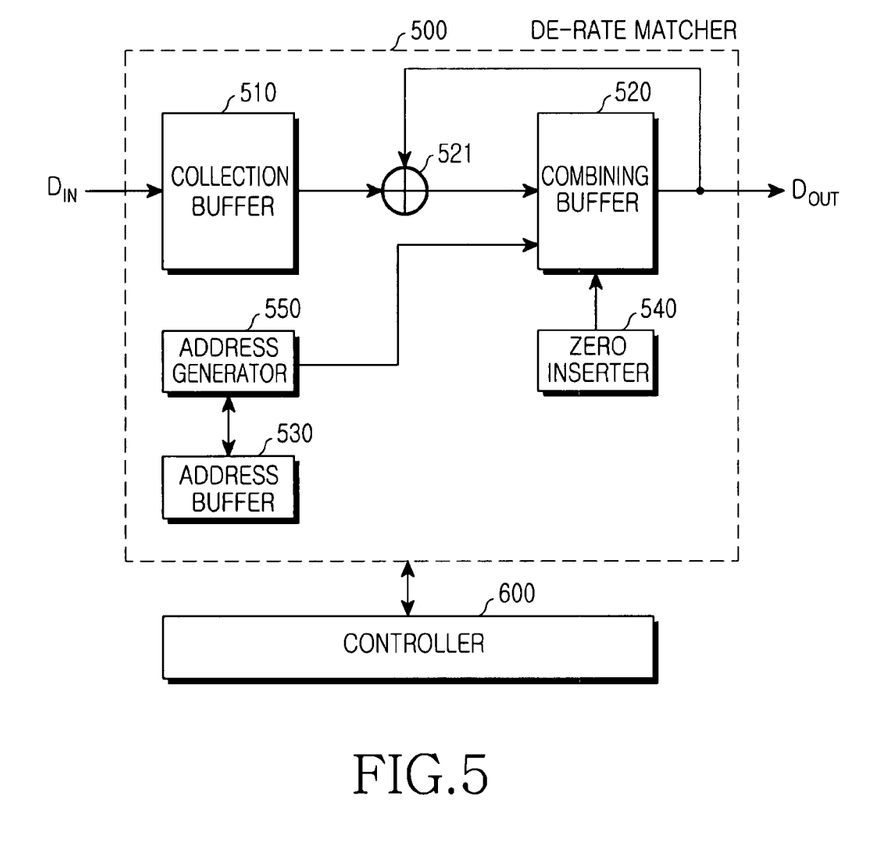
FIG. 5 is a block diagram of a de-rate matching apparatus in a HSDPA system according to an embodiment of the present invention.

FIG. 5 is a block diagram of a de-rate matching apparatus in a High Speed Downlink Packet Access (HSDPA) system according to an embodiment of the present invention. Referring to FIG. 5, the de-rate matching apparatus is provided in a receiver of, for example, a user equipment (UE). The de-rate matching apparatus comprises a de-rate matcher 500 for temporarily storing in a collection buffer 510 an input signal $D_{IN}$ which is an initial transmitted packet or a retransmitted packet received from the rate matching apparatus illustrated in FIG. 1 over a radio network, writing the data in a combining buffer 520 after a predetermined de-rate matching, and outputting the data stored in the combining buffer 520 as an output signal $D_{OUT}$ to a decoder (not shown), and a controller 600 for providing overall control to the operation of the de-rate matcher 500.

In the same manner as in the controller 400 illustrated in FIG. 2, the controller 600 receives a High Speed Shared Control Channel (HS-SCCH) signal from the Node B, interprets HARQ parameters included in the HS-SCCH signal, and determines whether received packet data is an initial transmitted packet or a retransmitted packet. The de-rate matcher 500 is so configured as to calculate the memory addresses of the packet data except punctured data for storing in the combining buffer, before de-rate matching, store them in an address buffer 530, and store only data received on an actual physical channel in the combining buffer 520 during the de-rate matching.

The Hybrid Automatic Repeat Request (HARQ) standard regulates that the HS-SCCH notifies a UE as to whether a packet to be transmitted on a High Speed Downlink Shared Channel (HS-DSCH) is an initial transmitted packet or a retransmitted packet and also notifies the UE of punctured data positions if a bit stream of the packet is punctured. According to the HARQ parameters, therefore, the controller 600 notifies a zero inserter 540 as to whether the received packet data is an initial transmitted packet or a retransmitted packet and notifies an address generator 550 of punctured data positions so that the address generator 550 can generate the memory addresses of a packet received on the actual physical channel.

The address generator 550 generates the memory addresses prior to the outputting of the received packet from the collection buffer 510 and stores them in the address buffer 530, starting from T1 illustrated in FIG. 3 by which decoding of the HS-SCCH information is completed. The zero inserter 540, if the interpretation of the HS-SCCH information tells the packet to be received is an initial transmitted packet, initializes all data stored in the combining buffer 520 to zeroes before de-rate matching.

For the de-rate matching, the bit streams of the packet are sequentially output from the collection buffer 510 and stored at the memory addresses designated by the address generator 550 in the combining buffer. In this case, the address generator 550 provides the memory addresses at which the bit streams are to be stored based on the memory addresses preliminarily stored in the address buffer 530. The combining buffer 520 de-rate matches the packet and stores the de-rate matched packet at the received memory addresses. The data from the combining buffer 520 is provided to the decoder.

If the HS-SCCH information indicates that the packet to be received is a retransmitted packet, the controller 600 controls the zero inserter 540 not to perform the initialization. Instead, the controller 600 sequentially outputs the remaining bits other than punctured bits at memory addresses, for example, #5, #10, #15, . . . as illustrated in FIG. 10B from the combining buffer 520 and controls a combiner 521 to combine them with a bit stream of the retransmitted packet. Then the combined data is stored in the combining buffer 520.

The thus-configured de-rate matching apparatus stores an M-bit packet in the collection buffer 510 as illustrated in FIG. 10A and stores a final de-rate matched N-bit packet (N>M) in the combining buffer 520 as illustrated in FIG. 10B, as in the de-rate matching apparatus of FIG. 2.

In accordance with an embodiment of the present invention, zeroes are stored in advance at punctured data positions, for example, 5, #10, #15, and so on as illustrated in FIG. 10B, through initialization of the collection buffer 520 before de-rate matching, and sequentially stores the bits of a packet buffered in the collection buffer 510 at memory addresses, #1, #2, #3, #4, #6, . . . , #8, #9, #11, and so on in the combining buffer 520 during de-rate matching. Therefore, it only has to write the M bits of the packet actually received on the physical channel in the combining buffer 520 during the de-rate matching. Consequently, the time required for writing zeroes in punctured data positions is saved from a total de-rate matching time.

Figure 6:
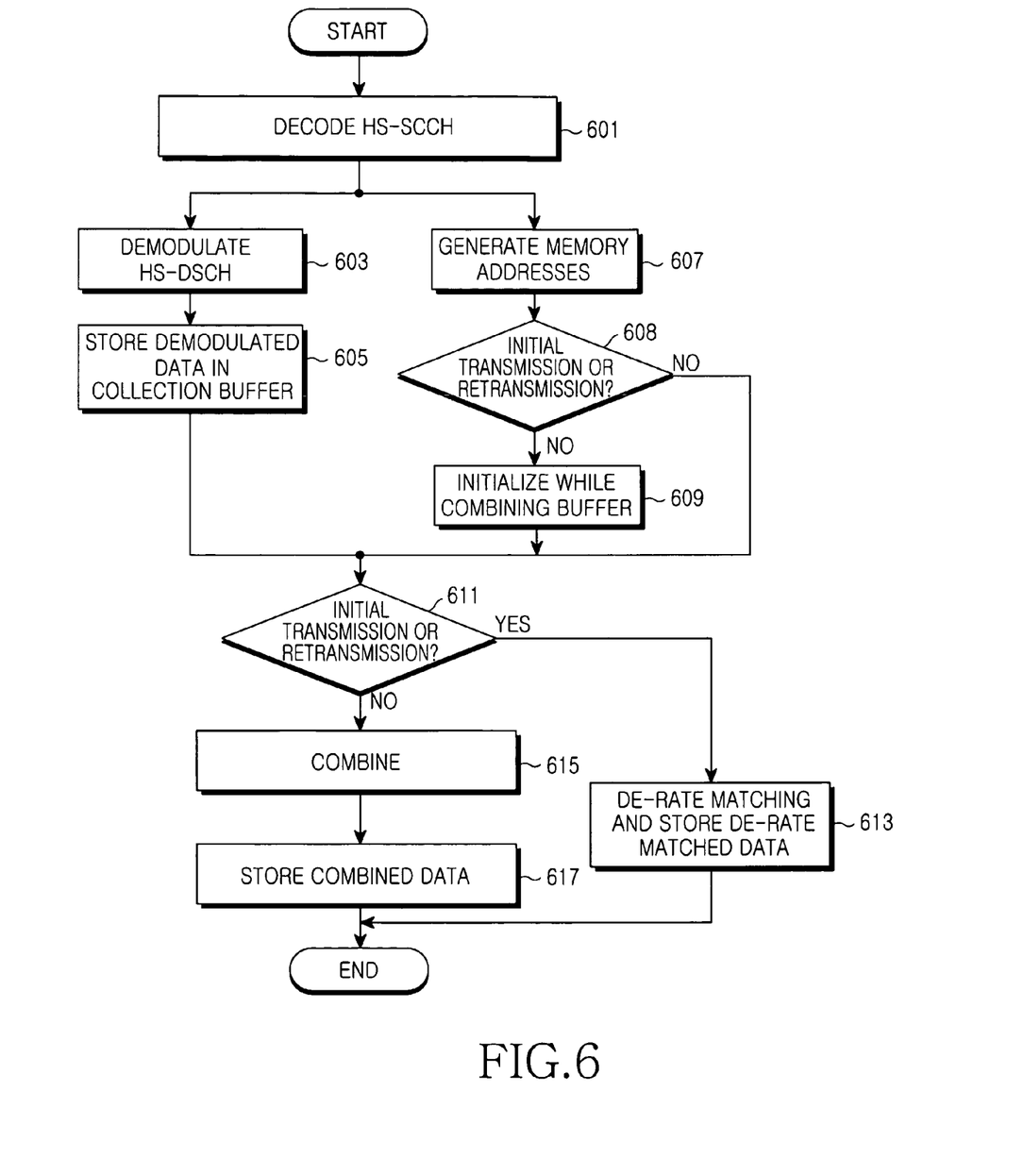
FIG. 6 is a flowchart illustrating a de-rate matching method in the HSDPA system according to an embodiment of the present invention.

FIG. 6 is a flowchart illustrating a de-rate matching method in the HSDPA system according to an embodiment of the present invention. The de-rate matching method will be described in the context of the de-rate matching apparatus illustrated in FIG. 5.

The transmitter of the Node B adapts the size of packet data to be transmitted to a transportable size on a physical channel through rate matching and transmits control information including HARQ parameters related to the packet transmission on the HS-SCCH.

Referring to FIG. 6, the UE receiver acquires basic de-rate matching information by decoding the HS-SCCH information in step 601. The basic de-rate matching information comprises information indicating the positions of bits punctured during the rate matching and information indicating whether the packet data is an initial transmitted packet or a retransmitted packet.

Two slots after the transmission start of the HS-SCCH as illustrated in FIG. 3, the Node B transmits the packet data on an HS-DSCH to the UE. In step 603, the UE receiver then demodulates the HS-DSCH information and provides the demodulated information $D_{IN}$ to the de-rate matching apparatus of FIG. 5. The collection buffer 510 of the de-rate matching apparatus temporarily stores the input signal $D_{IN}$ as illustrated in FIG. 10A in step 605.

Along with steps 603 and 605, the address generator 550 generates memory addresses at which the packet data will be stored based on the punctured bit positions received from the controller 600 and stores them in the address buffer 530 in step 607. The memory addresses at which zeroes will be stored on behalf of punctured bits are empty, spaced from the memory addresses of the received packet data. While the memory address generation is possible until before data output of the collection buffer 510 to the combining buffer 520, it is preferable that this operation takes place between the HS-SCCH decoding completion time T1 of FIG. 3 and the HS-DSCH reception completion time T2 of FIG. 3.

The controller 600 notifies the zero inserter 540 as to whether the received packet is an initial transmitted one or a retransmitted one in step 608. In the case of an initial transmitted packet, the zero inserter 540 initializes data at the whole memory addresses of the combining buffer 520 to zeroes in step 609. In the case of a retransmitted packet, the initialization is not performed.

If it is confirmed that the received packet is an initial transmitted packet in step 611, the controller 600 de-rate matches the data from the collection buffer 510 and stores the de-rate matched data in the combining buffer 520 by controlling the collection buffer 510 and the combining buffer 520 in step 613. If the memory addresses of the zeroes on behalf of the punctured bits are #5, #10, #15, and so on, the data stored at memory addresses #1, #2, #3 and #4 in the collection buffer 510 are buffered at the same memory addresses of the combining buffer 520 and the data stored at a memory address #5 in the collection buffer 510 is stored at a memory address #6 after the punctured bit data, zero at #5 in the combining buffer 520.

On the contrary, if it is confirmed that the received packet is a retransmitted packet in step 611, the controller 600 combines the previous data buffered in the collection buffer 520 with the data output from the collection buffer 510 according to their addresses by controlling the collection buffer 510 and the combining buffer 520 and then stores the combined data in the combining buffer 520 in step 615. Notably, the zeroes at the punctured bit positions are not combined with the data of the retransmitted packet. If the memory addresses of the zeroes in place of the punctured bits are #5, #10, #15, and so on, the data stored at memory addresses #1, #2, #3 and #4 in the collection buffer 510 are combined with the data at the same memory addresses of the combining buffer 520 and the data stored at a memory address #5 in the collection buffer 510 is combined with the data at a memory address #6 in the combining buffer 520.

In accordance with the above de-rate matching method, memory addresses at which the bits of a packet to be received are calculated beforehand, taking into account positions of zeroes inserted in place of punctured bits, and the zeroes are simultaneously written through memory initialization before de-rate matching. Therefore, only the data of the received packet is written in the combining buffer 520 during de-rate matching, thereby reducing a de-rate matching time.

Figure 7:
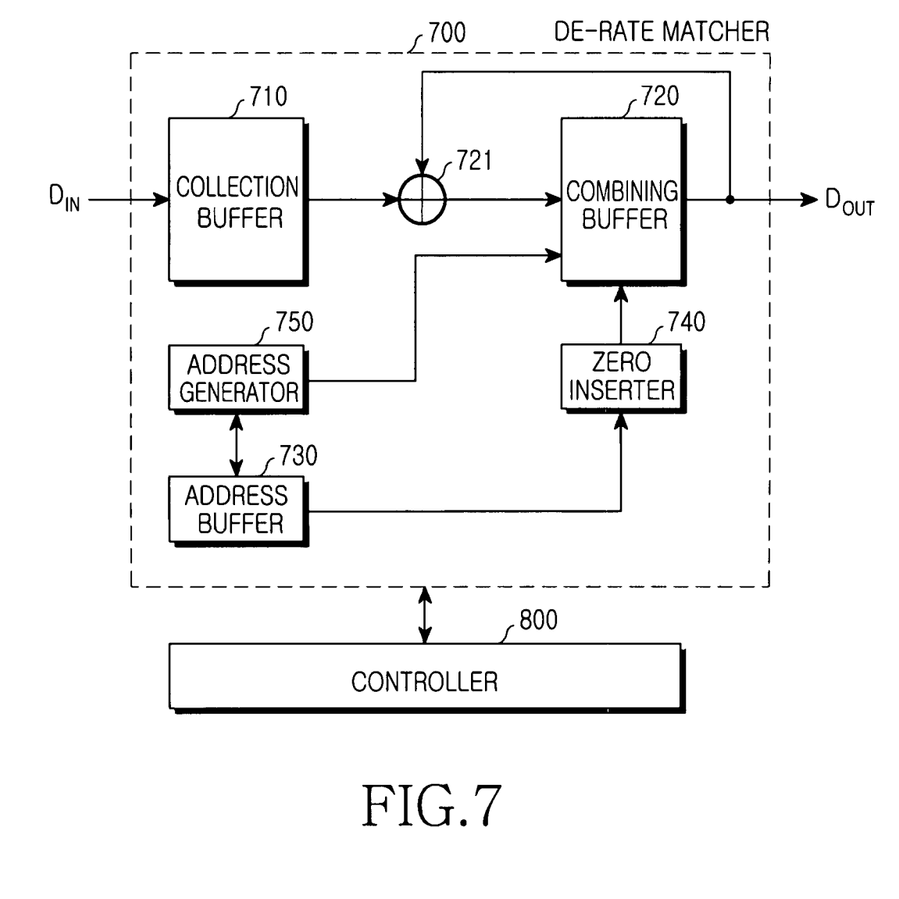
FIG. 7 is a block diagram of a de-rate matching apparatus in an HSDPA system according to another embodiment of the present invention.

FIG. 7 is a block diagram of a de-rate matching apparatus in an HSDPA system according to another embodiment of the present invention. This embodiment also comprises a de-rate matcher 700 and a controller 800 for providing overall control to the de-rate matcher 700. The de-rate matcher 700 includes a collection buffer 710, a combining buffer 720, a combiner 721, an address buffer 730, a zero inserter 740, and an address generator 750.

The de-rate matching apparatus of FIG. 7 is configured to insert zeroes at memory addresses for punctured bits without initializing data at the whole memory addresses of the combining buffer 720 by the zero inserter 740. The zero inserter 740 receives the memory addresses of the punctured bits from the address buffer 730. The de-rate matching apparatus operates in substantially the same manner as the de-rate matching apparatus of FIG. 5 and thus a description of common operational features is omitted.

Figure 8:
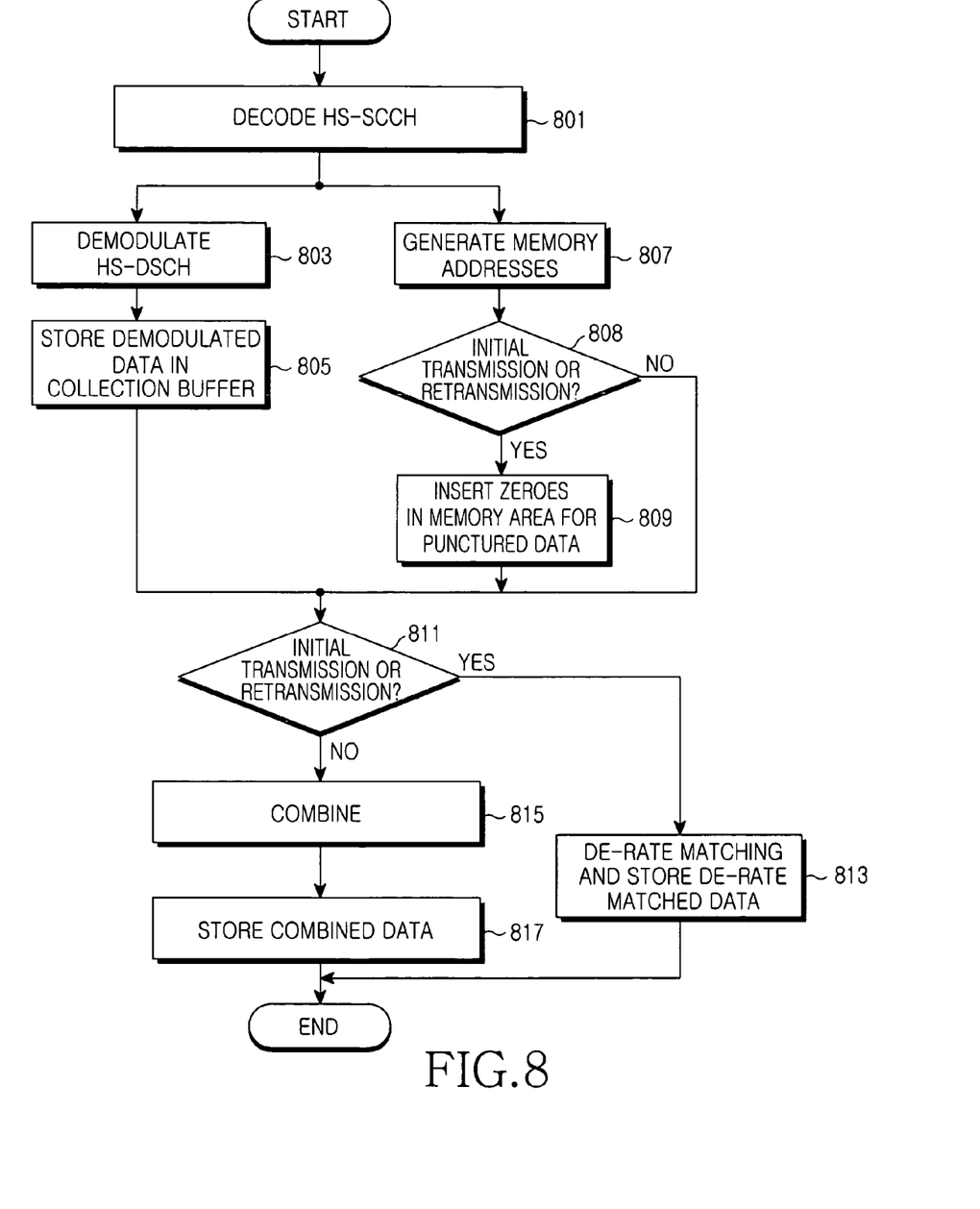
FIG. 8 is a flowchart illustrating a de-rate matching method in the HSDPA system according to the second embodiment of the present invention.

FIG. 8 is a flowchart illustrating a de-rate matching method in the HSDPA system according to the second embodiment of the present invention. The de-rate matching method is applied to the de-rate matching apparatus of FIG. 7. This procedure is characterized by insertion of zeroes at memory addresses for punctured bits in the combining buffer 720 in step 809. The other steps, steps 801 to 808 and steps 811 to 817 are performed in substantially the same manner as their counterparts steps 601 to 608 and steps 611 to 617 of the procedure shown in FIG. 6. Hence, they will not be described herein.

Figure 9:
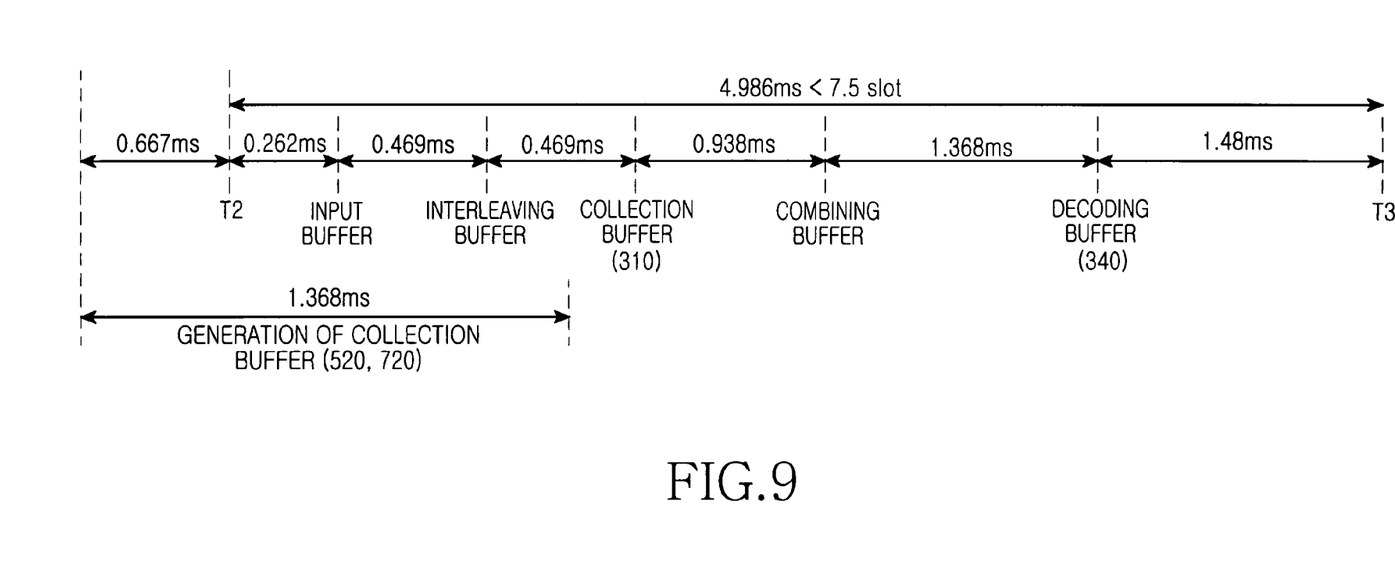
FIG. 9 illustrates time required for de-rate matching in the de-rate matching apparatus according to an embodiment of the present invention.

FIG. 9 illustrates the time required for de-rate matching in the de-rate matching apparatus according to an embodiment of the present invention. In the figure, the processing time in each of an input buffers (not shown) and an interleaving buffer (not shown), the collection buffer 510 or 710 and the combining buffer 520 or 720 for de-rate matching, and a decoding buffer (not shown) is sequentially illustrated between T2 and T3 illustrated in FIG. 3. This is the decoding time of UE category 10 in 3GPP Release 15, as in FIG. 4, for an IR buffer size of 88000 and a transport block size of 27954 bits which take the longest process time.

Referring to FIG. 9, an experiment performed by the present applicant reveals that the de-rate matching between the collection buffer 510 or 710 and the combining buffer 520 or 720 takes 0.938 ms, far shorter than the 2.736 ms shown in FIG. 4. Therefore, the use of the de-rate matching apparatus according to an embodiment of the present invention satisfies the time requirement of 7.5 or less slots for de-rate matching.

As described above, the de-rate matching method and apparatus of the present invention significantly shortens the time required for de-rate matching of a received packet at a receiver without the need for using an additional buffer or increasing the frequency of a transmission clock in an HSDPA system where rate matching is performed for downlink packet transmission. The de-rate matching apparatus has a simple configuration, which makes it applicable to UEs of every category, reduces UE complexity, and reduces product cost.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method of de-rate matching an initial transmitted packet data between a collection buffer and combining buffer in a receiver, the initial transmitted packet data being rate-matched in a transmitter in a high-speed packet transmission system, comprising the steps of:
    (a) receiving from the transmitter, high-speed shared common control channel (HS-SCCH) information comprising a predetermined hybrid automatic repeat request (HARQ) parameter associated with packet transmission, and decoding the HS-SCCH information;
    (b) generating and storing memory information related to a plurality of memory addresses for de-rate matching of the initial transmitted packet to be received according to the decoded HARQ parameter;
    (c) initializing data stored at memory addresses of the combining buffer including memory addresses for bits punctured during the rate matching; and
    (d) sequentially storing the initial transmitted packet data output from the collection buffer at memory addresses other than the memory addresses for the punctured bits according to the memory information in the combining buffer.

2. The method of claim 1, wherein the step of (b) is performed before a bit stream of the initial transmitted packet is provided to the combining buffer after the decoding of the HS-SCCH information is completed.

3. The method of claim 1, wherein the HARQ parameter comprises information indicating the positions of the punctured bits and information indicating whether a transmission packet is an initial transmitted packet or a retransmitted packet.

4. The method of claim 1, wherein the step of (c) further comprises the step of setting data stored at the whole memory addresses of the combining buffer to zeroes.

5. The method of claim 1, wherein the step of (c) further comprises the step of setting data stored at the memory addresses of the punctured bits in the combining buffer to zeroes.

6. A method of de-rate matching a retransmitted packet data between a collection buffer and combining buffer in a receiver, the retransmitted packet data being rate-matched in a transmitter in a high-speed packet transmission system, comprising the steps of:
    receiving from the transmitter, high-speed shared common control channel (HS-SCCH) information comprising a predetermined hybrid automatic repeat request (HARQ) parameter associated with packet transmission, and decoding the HS-SCCH information;
    generating and storing memory information related to a plurality of memory addresses for de-rate matching of the retransmitted packet to be received according to the decoded HARQ parameter;
    combining previous packet data stored in the combining buffer with the retransmitted packet stored in the collection buffer; and sequentially storing the combined packet data at memory addresses other than memory addresses for bits punctured during the rate matching according to the memory information in the combining buffer.

7. The method of claim 5, wherein the generating and storing step is performed before a bit stream of the initial transmitted packet is provided to the combining buffer after the decoding of the HS-SCCH information is completed.

8. The method of claim 5, wherein the HARQ parameter comprises information indicating the positions of the punctured bits and information indicating whether a transmission packet is an initial transmitted packet or a retransmitted packet.

9. An apparatus for de-rate matching a received packet which is rate-matched in a transmitter in a high-speed packet transmission system, comprising:

a collection buffer for temporarily storing the received packet;

a combining buffer for storing the packet received from the collection buffer according to predetermined memory address information comprising information indicating the positions of bits punctured during the rate matching;

a controller for decoding high-speed shared common control channel (HS-SCCH) information including a predetermined hybrid automatic repeat request (HARQ) parameter received from the transmitter and providing overall control to de-rate matching between the collection buffer and the combining buffer;

an address generator for generating the memory address information based on the decoded HARQ parameter;

an address buffer for storing the memory address information; and a zero inserter for initializing at least one of data stored at memory addresses of the combining buffer including memory addresses for the punctured, before the de-rate matching.

10. The apparatus of claim 9, wherein the zero inserter sets data stored at the whole memory addresses of the combining buffer to zeroes.

11. The apparatus of claim 9, wherein the zero inserter sets data stored at the memory addresses of the punctured bits in the combining buffer to zeroes.

* * * * *